(12) United States Patent
Weh et al.

(10) Patent No.: US 12,139,125 B2
(45) Date of Patent: Nov. 12, 2024

(54) ELECTROHYDRAULIC POWER VEHICLE BRAKING SYSTEM FOR AN AUTONOMOUSLY DRIVING LAND VEHICLE

(71) Applicant: Robert Bosch GmbH, Stuttgart (DE)

(72) Inventors: Andreas Weh, Sulzberg (DE); Armin Kunz, Ditzingen (DE); Shogo Miyoshi, Yokohama (JP); Stefan Strengert, Plymouth, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 499 days.

(21) Appl. No.: 17/413,375

(22) PCT Filed: Sep. 26, 2019

(86) PCT No.: PCT/EP2019/076030
§ 371 (c)(1),
(2) Date: Jun. 11, 2021

(87) PCT Pub. No.: WO2020/126138
PCT Pub. Date: Jun. 25, 2020

(65) Prior Publication Data
US 2022/0063577 A1    Mar. 3, 2022

(30) Foreign Application Priority Data
Dec. 20, 2018 (DE) .......................... 102018222488.9

(51) Int. Cl.
*B60T 8/40* (2006.01)
*B60T 7/04* (2006.01)
*B60T 13/68* (2006.01)

(52) U.S. Cl.
CPC ............ *B60T 8/4081* (2013.01); *B60T 7/042* (2013.01); *B60T 13/686* (2013.01)

(58) Field of Classification Search
CPC ....... B60T 8/4081; B60T 13/686; B60T 7/042
See application file for complete search history.

(56) References Cited

U.S. PATENT DOCUMENTS 9,914,440 B2 *  3/2018  Bauer ................... B60T 8/442
10,926,748 B2 *  2/2021  Besier ................. B60T 8/4086
(Continued)

FOREIGN PATENT DOCUMENTS

CN    102189987 A    9/2011
CN    102307760 A    1/2012
(Continued)

OTHER PUBLICATIONS

WO document No. WO 2020244839 to Yao et al published on Dec. 10, 2020.*

(Continued)

*Primary Examiner* — Pamela Rodriguez
(74) *Attorney, Agent, or Firm* — NORTON ROSE FULBRIGHT US LLP; Gerard A. Messina

(57) ABSTRACT

An electrohydraulic power vehicle braking system for a motor vehicle driving autonomously on public roads is equipped with two redundant power brake pressure generators so that, in the event of independent driving and a failure of one power brake pressure generator, the other power brake pressure generator is able to decelerate the motor vehicle without driver intervention.

9 Claims, 1 Drawing Sheet

(56) References Cited

U.S. PATENT DOCUMENTS

| | | |
|---|---|---|
| 2008/0210496 A1 | 9/2008 | Ishii |
| 2014/0182283 A1 | 7/2014 | Ohnishi et al. |
| 2014/0203626 A1 | 7/2014 | Biller et al. |
| 2016/0009267 A1 | 1/2016 | Lesinski, Jr. |
| 2017/0282877 A1 | 10/2017 | Besier et al. |
| 2019/0241167 A1* | 8/2019 | Peichl ............... B60T 13/161 |
| 2020/0172067 A1* | 6/2020 | Einig ................. B60T 7/042 |
| 2022/0258710 A1* | 8/2022 | Weh .................. B60T 13/745 |

FOREIGN PATENT DOCUMENTS

| | | |
|---|---|---|
| CN | 105764759 A | 7/2016 |
| CN | 105813911 A | 7/2016 |
| CN | 106458176 A | 2/2017 |
| CN | 106458183 A | 2/2017 |
| CN | 107000718 A | 8/2017 |
| CN | 107428323 A | 12/2017 |
| DE | 102012205862 A1 | 10/2012 |
| DE | 102014220440 A1 | 7/2015 |
| DE | 102017216118 A1 | 4/2018 |
| EP | 2749466 A1 | 7/2014 |
| JP | 2008174169 A | 7/2008 |
| JP | 2017007524 A | 1/2017 |
| WO | 2012143175 A2 | 10/2012 |
| WO | 2012143312 A1 | 10/2012 |

OTHER PUBLICATIONS

International Search Report for PCT/EP2019/076030, Issued Feb. 6, 2020.

\* cited by examiner

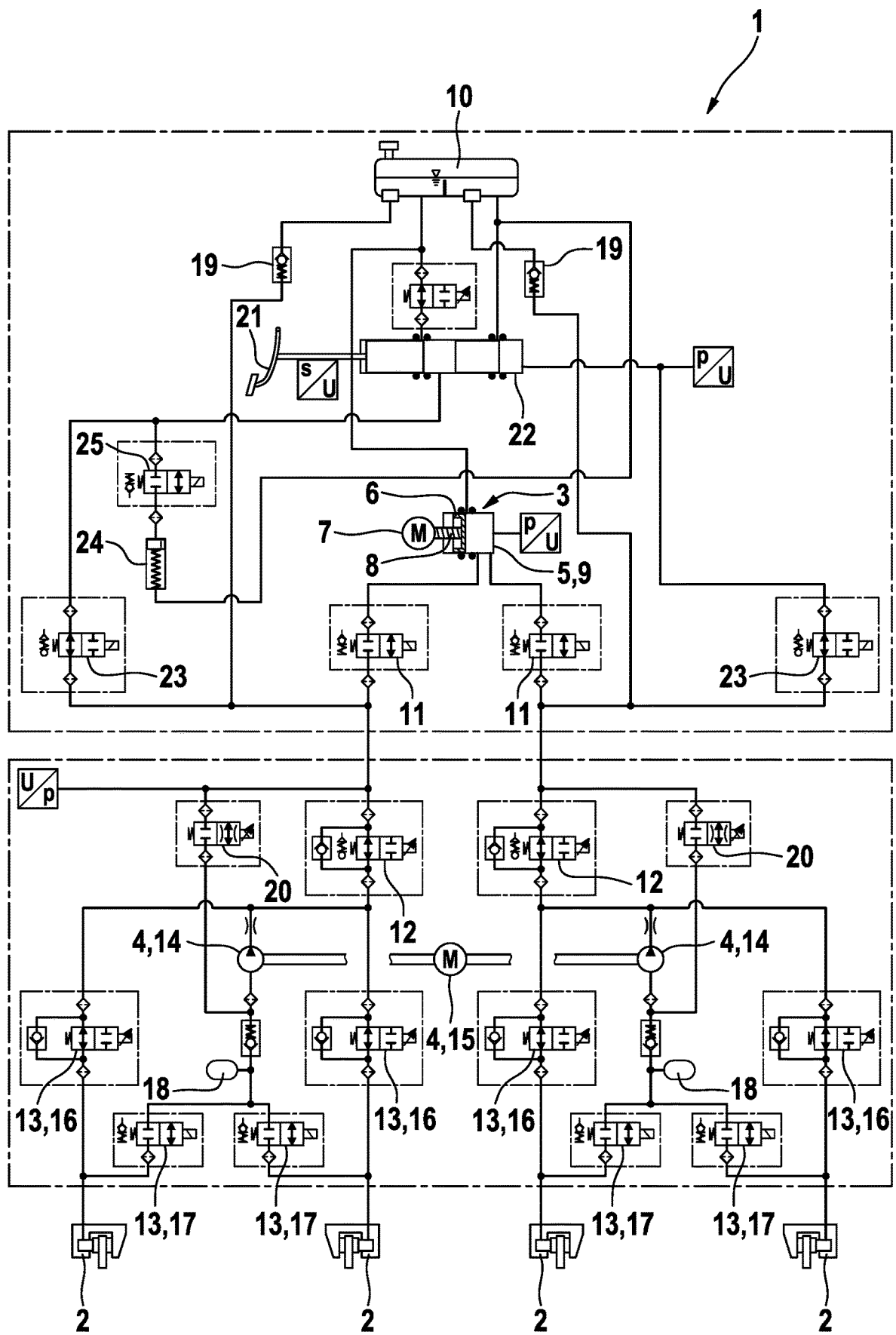

ELECTROHYDRAULIC POWER VEHICLE BRAKING SYSTEM FOR AN AUTONOMOUSLY DRIVING LAND VEHICLE

FIELD

The present invention relates to an electrohydraulic power vehicle braking system for a land vehicle driving autonomously on public roads. The designation "autonomously driving" relates to the option of driving autonomously, however the vehicle braking system according to the present invention is also usable for land vehicles not driving autonomously or driving autonomously at a lower level.

BACKGROUND INFORMATION

A power vehicle braking system including redundancies which precludes a complete failure of the vehicle braking system with a probability bordering on certainty, without necessitating a driver intervention, is necessary for autonomous driving up to Level 4 (driver may be prompted to intervene) and Level 5 (highest level; no driver required).

German Patent Application No. DE 10 2014 220 440 A1 describes an electrohydraulic power vehicle braking system including two brake units, which both include a respective power brake pressure generator including an electrically controllable pressure source and a brake pressure control valve system for each wheel brake. One brake unit is connected to the other brake unit, and hydraulic wheel brakes are connected to the one brake unit, so that the wheel brakes are actuatable with the aid of the one brake unit and, through the one brake unit, with the aid of the other brake unit. In the event of a malfunction or a failure of one brake unit, the wheel brakes are thus actuatable without driver intervention with the aid of the other brake unit. The respective active brake unit regulates the wheel brake pressures in the wheel brakes.

SUMMARY

The electrohydraulic power vehicle braking system according to the present invention is provided for an autonomous driving up to Levels 4 and 5 on public roads. Level 4 is also referred to as highly automated driving and means that the guidance of a vehicle is permanently taken over by an electronic system, and a driver is only prompted to intervene when the system no longer copes with the driving tasks. Level 5 is also referred to as full automation and does not require a driver. The vehicle braking system according to the present invention, however, is also usable for lower levels and for non-autonomous driving.

The electrohydraulic power vehicle braking system according to an example embodiment of the present invention includes two redundant power brake pressure generators to which one or multiple hydraulic wheel brake(s) is/are connected, so that they are selectively actuatable with the aid of one of the two, or with the aid of both, power brake pressure generators. In this way, a power brake application is possible without driver intervention in the event of a malfunction or a failure of one of the two power brake pressure generators. Both power brake pressure generators are connected to an, in particular, depressurized brake fluid reservoir, it being possible for the two power brake pressure generators to be connected together to a brake fluid reservoir or in each case to a dedicated brake fluid reservoir.

Preferably, a first of the two power brake pressure generators is connected directly, i.e., without an interposed valve, to the brake fluid reservoir and/or a second of the two power brake pressure generators is connected by one or multiple valve(s) to the brake fluid reservoir.

The second power brake pressure generator is preferably connected to the brake fluid reservoir by a check valve, through which a flow is possible in the direction from the brake fluid reservoir to the second power brake pressure generator, and/or by a power-operated valve. The valve is, in particular, a solenoid valve. If present, the check valve and the or also multiple power-operated valve(s) are preferably hydraulically connected in series.

The vehicle braking system according to an example embodiment of the present invention may include one or multiple brake circuit(s), each including one or multiple wheel brake(s). For a passenger car, the vehicle braking system, in particular, includes two brake circuits, each including two wheel brakes.

Advantageous embodiments and refinements of the present invention are disclosed herein.

In accordance with an example embodiment of the present invention, a brake pressure control valve system is provided for a preferably wheel-specific regulation of wheel brake pressures in the wheel brakes. Such brake pressure control valve systems are conventional and usually, even though this is not mandatory for the present invention, include an intake valve and a discharge valve for each wheel brake, possibly also for groups of wheel brakes or for all wheel brakes. The intake valve and the discharge valve may also be combined into one valve. In addition to the regulation of the wheel brake pressures in the wheel brakes, and thus the regulation of the wheel brake forces during braking, slip controls, such as anti-lock braking, anti-slip and vehicle dynamics controls/electronic stability programs are possible with the aid of the brake pressure control valve system, for which the abbreviations ABS, ASR and VDC/ESP are common. Vehicle dynamics control systems, which are also referred to as electronic stability programs, are also colloquially referred to as anti-skid control systems.

In accordance with an example embodiment of the present invention, the brake pressure control valve system is connected by a valve to the first power brake pressure generator and/or directly to the second power brake pressure generator so that, by closing of the valve, the brake pressure control valve system is disconnectable from the first power brake pressure generator for an actuation of the vehicle braking system with the aid of a master brake cylinder, if present, and/or with the aid of the second power brake pressure generator. The vehicle braking system according to the present invention is preferably designed in such a way that, as a result of the disconnection of the brake pressure control valve system from the first power brake pressure generator, the wheel brakes are also disconnected from the first power brake pressure generator, and the wheel brake pressures in the wheel brakes, during an actuation of the vehicle braking system, are regulatable with the aid of the master brake cylinder and/or the second power brake pressure generator.

In accordance with an example embodiment of the present invention, the wheel brakes are connected by discharge valves, which, in particular, form parts of the brake pressure control valve system, to the first power brake pressure generator and/or to the second power brake pressure generator. In the case of a reduction of wheel brake pressures in one or multiple wheel brake(s) as a result of opening of the discharge valve(s), in this embodiment of the present invention brake fluid does not flow out of the wheel brake(s) and back into the, in particular, depressurized brake fluid reservoir, but to the power brake pressure generators. In this way, the brake pressure does not need to be newly built up for a subsequent renewed increase in the wheel brake pressures, but only the existing brake pressure has to be increased.

The vehicle braking system according to an example embodiment of the present invention preferably includes a muscle power or auxiliary force brake pressure generator, in addition to the two power brake pressure generators. "Auxiliary force" shall be understood to mean a muscle power actuation supported by a brake booster. The muscle power or auxiliary force brake pressure generator is, in particular, a master brake cylinder actuatable with the aid of a hand brake lever or a foot brake pedal, which in the case of a power actuation of the vehicle braking system serves as a setpoint generator for a brake pressure of the vehicle braking system. A muscle power or auxiliary force brake application may, in particular, be provided for the case of a malfunction or a failure of one or both power brake pressure generator(s) during a non-autonomous, but driver-guided driving.

All features described herein and shown in the figures may be implemented in exemplary embodiments of the present invention either alone or in a generally arbitrary combination. Embodiments of the present invention which do not include all, but only one or multiple features of the present invention are generally possible.

BRIEF DESCRIPTION OF THE DRAWINGS

The present invention is described in greater detail hereafter based on one specific embodiment shown in the figure.

The sole figure shows a hydraulic circuit diagram of an electrohydraulic power vehicle braking system according to an example embodiment of the present invention.

DETAILED DESCRIPTION OF EXAMPLE EMBODIMENTS

The electrohydraulic power vehicle braking system 1 according to an example embodiment of the present invention shown in the figure is provided for a land vehicle driving autonomously up to Levels 4 or 5 on public roads, namely a passenger car. Level 4 means an autonomous driving, a driver possibly being prompted to intervene, and Level 5, the highest level, means an autonomous driving which does not necessitate a driver intervention. Lower levels and non-autonomous driving are possible.

Vehicle braking system 1 according to an example embodiment of the present invention is designed as a dual-circuit braking system including four hydraulic wheel brakes 2, of which two in each case are connected to one of the two brake circuits.

Vehicle braking system 1 includes a first power brake pressure generator 3 and a second power brake pressure generator 4. The two power brake pressure generators 3, 4 are redundant, and vehicle braking system 1 may be selectively actuated with the aid of one or also both power brake pressure generator(s) 3, 4.

In the shown and described specific embodiment of the present invention, first power brake pressure generator 3 includes a piston-cylinder unit 5, whose piston 6 is axially displaceable in a cylinder 9 for generating a brake pressure with the aid of an electric motor 7 via a threaded drive 8 or another rotation/translation conversion gear. Piston-cylinder unit 5 may also be referred to as a plunger unit, and piston 6 may be referred to as a plunger piston. In the shown and described specific embodiment of the present invention, cylinder 7 of piston-cylinder unit 5 of first power brake pressure generator 3 is connected directly, i.e., without interposition of a valve, to a depressurized brake fluid reservoir 10.

Wheel brakes 2 are connected to first power brake pressure generator 3, more precisely to cylinder 9 of piston-cylinder unit 5 of first power brake pressure generator 3, via valves referred to as plunger valves 11 here, first separating valves 12, and a brake pressure control valve system 13. For the division into the two brake circuits, two plunger valves 11 are hydraulically situated in parallel, two first separating valves 12 are also hydraulically situated in parallel, and a plunger valve 11 and a first separating valve 12 are each hydraulically connected in series. Via brake pressure control valve system 13, two wheel brakes 2 are in each case connected to first power brake pressure generator 3 via a plunger valve 11 and a first separating valve 12.

Second power brake pressure generator 4 includes a hydraulic pump 14, for example a piston pump or an (internal) gear pump, which together are drivable by an electric motor 15, in each brake circuit. Two of wheel brakes 2 are in each case connected via an intake valve 16 for each wheel brake 2 to a pressure side of one of hydraulic pumps 14.

Via a respective discharge valve 17, each of wheel brakes 2 is connected to suction sides of hydraulic pumps 14 of second power brake pressure generator 4, wheel brakes 2 being connected via discharge valves 17 to the suction side of the same hydraulic pump 14 to whose pressure side they are connected via the intake valves 16. Hydraulic accumulators 18 are connected on the suction sides of hydraulic pumps 14 between discharge valves 17 and hydraulic pumps 14.

Viewed from the direction of the brake fluid reservoir, the suction sides of hydraulic pumps 14 of second power brake pressure generator 4 are connected to brake fluid reservoir 10 by a respective check valve 19, through which a flow is possible in the direction from brake fluid reservoir 10 to the respective hydraulic pump 14, and a suction valve 20, so that a brake pressure generation for actuating wheel brakes 2 with the aid of second power brake pressure generator 4 is possible with open suction valves 20.

The present invention is not limited to the described power brake pressure generators 3, 4, and other embodiments of the power brake pressure generators are possible (not shown).

As described above, vehicle braking system 1 may selectively be actuated with the aid of each of the two power brake pressure generators 3, 4 so that, in the event of a failure or a malfunction of one of the two power brake pressure generators 3, 4, vehicle braking system 1 may be actuated without a driver intervention by external power with the aid of the other of the two power brake pressure generators 3, 4. Such a redundancy of the power actuation of vehicle braking system 1 is a prerequisite for an autonomous driving at Levels 4 and 5.

Intake valves 16 and discharge valves 17 form brake pressure control valve system 13 with the aid of which the wheel brake pressures in each wheel brake 2 may be individually regulated. Together with hydraulic pumps 14 of second power brake pressure generator 4, slip controls, in particular, anti-lock braking, anti-slip and/or a vehicle dynamics controls or an electronic stability program, are possible. The abbreviations ABS, ASR and/or VDC/ESP are common for these slip controls, and vehicle dynamics control systems and electronic stability programs are also colloquially referred to as anti-skid control systems. Such slip controls are conventional and are not discussed in greater detail here.

Vehicle braking system 1 according to the present invention includes a dual-circuit master brake cylinder 22, actuatable with the aid of a foot brake pedal 21, as a muscle power brake pressure generator, to which wheel brakes 2 in each brake circuit are connected in each case via a second separating valve 23, first separating valves 12, and intake valves 16 of brake pressure control valve system 13, so that vehicle braking system 1 is also actuatable by muscle power by a vehicle driver. Second separating valves 23, first separating valves 12, and intake valves 16 are hydraulically situated in series.

In principle, an actuation of vehicle braking system 1 by external power is provided, a brake pressure being generated with the aid of first power brake pressure generator 3 and, in the event of a malfunction or a failure of first power brake pressure generator 3, with the aid of second power brake pressure generator 4. The sequence of the brake pressure generation may also be reversed. Master brake cylinder 15 serves as a setpoint generator for the wheel brake pressures in wheel brakes 2 during a driver operation, the brake pressure being generated with the aid of one of the two power brake pressure generators 3, 4, and the level of the brake pressure being controlled or regulated with the aid of piston 6 of piston-cylinder unit 5 of first power brake pressure generator 3 when it generates the brake pressure and/or with the aid of brake pressure control valve system 13. During an autonomous driving, the setpoint value for the wheel brake pressures comes from an autonomous vehicle guidance.

During the driver operation, the brake pressure may be generated with the aid of second power brake pressure generator 4 or with the aid of master brake cylinder 22 in the event of a malfunction or a failure of first power brake pressure generator 3.

A pedal travel simulator 24 is connected via a simulator valve 25 to master brake cylinder 22 in one of the two brake circuits. Pedal travel simulator 24 is a spring-loaded hydraulic accumulator in which, with an open simulator valve 25, brake fluid may be displaced from master brake cylinder 22 so that, during a power brake application during which second separating valves 23 are closed, a piston in master brake cylinder 22 is displaceable, and foot brake pedal 22 is movable, to convey to the vehicle driver a customary pedal sensation.

In the described and illustrated specific embodiment of the present invention, plunger valves 11, first separating valves 12, intake valves 16, discharge valves 17, suction valves 20, second separating valves 23, and simulator valve 25 are 2/2-way solenoid valves, first separating valves 12, intake valves 16, and second separating valves 23 being open in their de-energized basic positions, and plunger valves 11, discharge valves 17, suction valves 20, and simulator valve 25 being closed in their de-energized basic positions. For the purpose of a better control quality of the wheel brake pressures, intake valves 13 are designed as proportional valves, however this is not mandatory for the present invention. Other embodiments of the valves are not precluded. For example, a combination of intake valves 16 and of discharge valves 17 into 3/2 solenoid valves is also possible (not shown).

What is claimed is:

1. An electrohydraulic power vehicle braking system for a land vehicle driving autonomously on public roads, comprising:
    a first power brake pressure generator to which both hydraulic brake wheels are connected; and
    a second power brake pressure generator to which both hydraulic wheel brakes are connected;
    wherein both the first and second power brake pressure generators are connected to a brake fluid reservoir, and
    wherein the first power brake pressure generator is connected directly to the reservoir without interposition of a valve.

2. The electrohydraulic power vehicle braking system as recited in claim 1, wherein the second power brake pressure generator is connected by one or multiple valve(s) to the brake fluid reservoir.

3. The electrohydraulic power vehicle braking system as recited in claim 2, wherein the first power brake pressure generator includes a piston-cylinder unit and/or the second power brake pressure generator includes a hydraulic pump.

4. The electrohydraulic power vehicle braking system as recited in claim 2, wherein the vehicle braking system includes a brake pressure control valve system configured to regulate wheel brake pressures in the wheel brakes.

5. The electrohydraulic power vehicle braking system as recited in claim 4, wherein the brake pressure control valve system is connected by a valve to the first power brake pressure generator and/or directly to the second power brake pressure generator.

6. The electrohydraulic power vehicle braking system as recited in claim 1, wherein the second power brake pressure generator is connected by a check valve and/or a power-actuated valve to the brake fluid reservoir.

7. The electrohydraulic power vehicle braking system as recited in claim 1, wherein the second power brake pressure generator is connected by a valve to the first power brake pressure generator.

8. The electrohydraulic power vehicle braking system as recited in claim 1, wherein the wheel brakes are connected by discharge valves to the first power brake pressure generator and/or to the second power brake pressure generator.

9. The electrohydraulic power vehicle braking system as recited in claim 1, wherein the vehicle braking system includes a muscle power or auxiliary force brake pressure generator, using which the wheel brakes are actuatable.

* * * * *